US009762363B2

(12) United States Patent
Won et al.

(10) Patent No.: US 9,762,363 B2
(45) Date of Patent: Sep. 12, 2017

(54) METHOD AND APPARATUS FOR PERFORMING COORDINATED COMMUNICATION IN A COMMUNICATION SYSTEM

(71) Applicant: Samsung Electronics Co., Ltd., Suwon-si, Gyeonggi-do (KR)

(72) Inventors: Sung-Hwan Won, Suwon-si (KR); Hyo-Jin Lee, Suwon-si (KR); Jin-Young Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 14/657,104

(22) Filed: Mar. 13, 2015

(65) Prior Publication Data
US 2015/0263834 A1    Sep. 17, 2015

(30) Foreign Application Priority Data

Mar. 13, 2014  (KR) .................. 10-2014-0029729
Apr. 3, 2014   (KR) .................. 10-2014-0040151
Apr. 10, 2014  (KR) .................. 10-2014-0042830
Jul. 23, 2014  (KR) .................. 10-2014-0093464

(51) Int. Cl.
*H04W 4/00* (2009.01)
*H04L 5/00* (2006.01)
(Continued)

(52) U.S. Cl.
CPC .......... *H04L 5/0035* (2013.01); *H04B 7/022* (2013.01); *H04B 17/327* (2015.01); *H04J 11/0056* (2013.01); *H04J 11/0093* (2013.01); *H04L 5/0044* (2013.01); *H04L 5/0057* (2013.01); *H04L 5/0092* (2013.01); *H04W 72/04* (2013.01); *H04W 72/12* (2013.01)

(58) Field of Classification Search
None
See application file for complete search history.

(56) References Cited

U.S. PATENT DOCUMENTS

2011/0103339 A1   5/2011   Kim et al.
2012/0178462 A1   7/2012   Kim
(Continued)

OTHER PUBLICATIONS

Texas Instruments, "On signaling for CoMP with non-ideal backhaul" R1-140539, Feb. 1, 2014.
(Continued)

*Primary Examiner* — Bob Phunkulh
(74) *Attorney, Agent, or Firm* — Jefferson IP Law, LLP (57) ABSTRACT

A method and apparatus for performing coordinated communication between radio access points in a communication system are provided. The method includes receiving, by a first radio access point, a message requesting channel information from a second radio access point, transmitting, by the first radio access point, a response message in reply to the message requesting channel information to the second radio access point, transmitting, by the first radio access point, a message reporting the channel information to the second radio access point, and receiving, by the first radio access point, resource allocation information for Coordinated Multi-Point transmission and reception (CoMP) from the second radio access point.

16 Claims, 4 Drawing Sheets

(51) Int. Cl.
*H04J 11/00* (2006.01)
*H04B 7/022* (2017.01)
*H04B 17/327* (2015.01)
*H04W 72/12* (2009.01)
*H04W 72/04* (2009.01)

(56) References Cited

U.S. PATENT DOCUMENTS

| | | | |
|---|---|---|---|
| 2013/0021929 A1* | 1/2013 | Kim | H04B 7/024 370/252 |
| 2013/0157712 A1* | 6/2013 | Park | H04W 36/18 455/525 |
| 2013/0223272 A1* | 8/2013 | Tao | H04B 7/024 370/252 |
| 2014/0029531 A1 | 1/2014 | Chang et al. | |
| 2014/0192734 A1* | 7/2014 | Ng | H04L 5/0035 370/329 |
| 2014/0204871 A1* | 7/2014 | Ode | H04B 7/024 370/329 |
| 2014/0243002 A1* | 8/2014 | Muruganathan | H04W 72/0426 455/450 |
| 2014/0376478 A1* | 12/2014 | Morita | H04W 72/0426 370/329 |
| 2015/0117345 A1* | 4/2015 | Kim | H04L 5/0091 370/329 |
| 2015/0189626 A1* | 7/2015 | Zhu | H04W 72/042 370/329 |
| 2015/0230113 A1* | 8/2015 | Zhang | H04L 43/06 370/252 |
| 2015/0295686 A1* | 10/2015 | Deng | H04L 5/0048 370/329 |
| 2015/0365967 A1* | 12/2015 | Ni | H04B 7/0456 370/329 |
| 2016/0021642 A1* | 1/2016 | Kim | H04L 5/0039 370/329 |
| 2016/0037511 A1* | 2/2016 | Vincze | H04B 7/024 370/329 |

OTHER PUBLICATIONS

R1-140378 Samsung "Signalling for Inter-eNB CoMP Operation", Feb. 1, 2014.

* cited by examiner

METHOD AND APPARATUS FOR PERFORMING COORDINATED COMMUNICATION IN A COMMUNICATION SYSTEM

CROSS-REFERENCE TO RELATED APPLICATION(S)

This application claims the benefit under 35 U.S.C. §119(a) of a Korean patent application filed on Mar. 13, 2014 in the Korean Intellectual Property Office and assigned Serial No. 10-2014-0029729, and of a Korean patent application filed on Apr. 3, 2014 in the Korean Intellectual Property Office and assigned Serial No. 10-2014-0040151, and of a Korean patent application filed on Apr. 10, 2014 in the Korean Intellectual Property Office and assigned Serial No. 10-2014-0042830, and of a Korean patent application filed on Jul. 23, 2014 in the Korean Intellectual Property Office and assigned Serial No. 10-2014-0093464, the entire disclosure of each of which is hereby incorporated by reference.

TECHNICAL FIELD

The present disclosure relates to a method and apparatus for performing coordinated communication in a wireless communication system. More particularly, the present disclosure relates to a method and apparatus for efficiently exchanging information between radio access points, for coordinated communication.

BACKGROUND

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

At their initial developmental stage, wireless communication systems sought to provide voice service, ensuring mobility of users. The wireless communication systems have evolved to provide data service beyond voice service. Now, the wireless communication systems are capable of providing high-speed data service.

Figure 1:
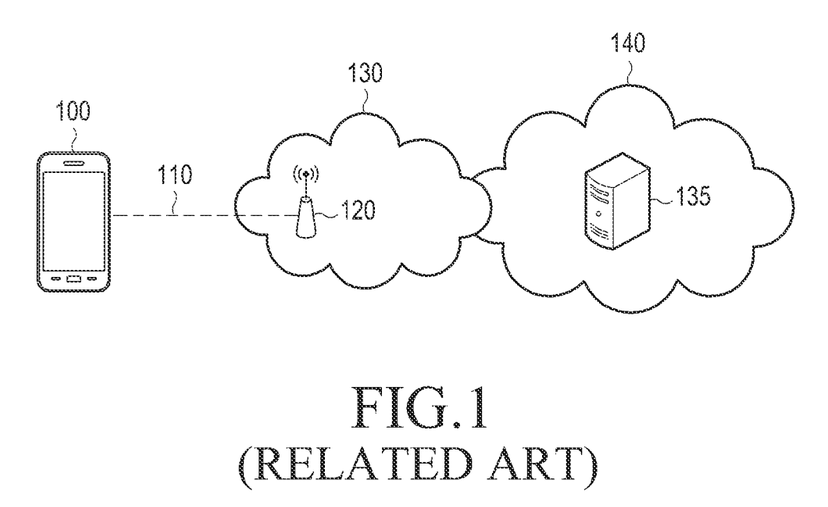
FIG. 1 illustrates a configuration of a wireless communication system according to the related art.

FIG. 1 illustrates a configuration of a wireless communication system according to the related art.

Referring to FIG. 1, the wireless communication system may include a User Equipment (UE) 100, a Radio Access Network (RAN) 130, and a core network 140.

The RAN 130 may communicate with the UE 100 via a radio interface 110. The other components of the wireless communication system may be interconnected mainly by cable. A RAN component 120 interacting with the UE 100 via the radio interface 110 may be any of, for example, an evolved Node B (eNB), a Node B, a Radio Network Subsystem (RNS) including an eNB or a Node B, a Base Transceiver Station (BTS), a Base Station Subsystem (BSS) including a Base Station (BS), a radio access point, a home eNB, a home Node B, a home eNB GateWay (GW), and an X2 GW. For the convenience of description, at least one of the RAN components 120 or the RAN 130 will be referred to as a 'radio access point' in the present disclosure.

The radio access point 120 may manage one or more cells. A cell covers a specific area and the UE 100 is serviced within the coverage area of a cell. The cell refers to a cell of a cellular system and the radio access point 120 refers to a device that manages and controls the cell. However, the cell and the radio access point 120 may be interchangeably used in the same meaning for the convenience of description in the present disclosure. When an object (for example, an embodiment) is described, the cell and the radio access point 120 may also be interchangeably used in the same meaning for the convenience of description.

The core network 140 may include a RAN control entity 135. The RAN control entity 135 is responsible for overall control functions including mobility management, authentication, and security. The RAN control entity 135 may be at least one of, for example, a Mobility Management Entity (MME) and a Serving GPRS Support Node (SGSN).

Since the radio access point 120 provides a service to the UE 100 via the radio interface 110, the radio access point 120 has an appropriate coverage area for providing the service.

Figure 2:
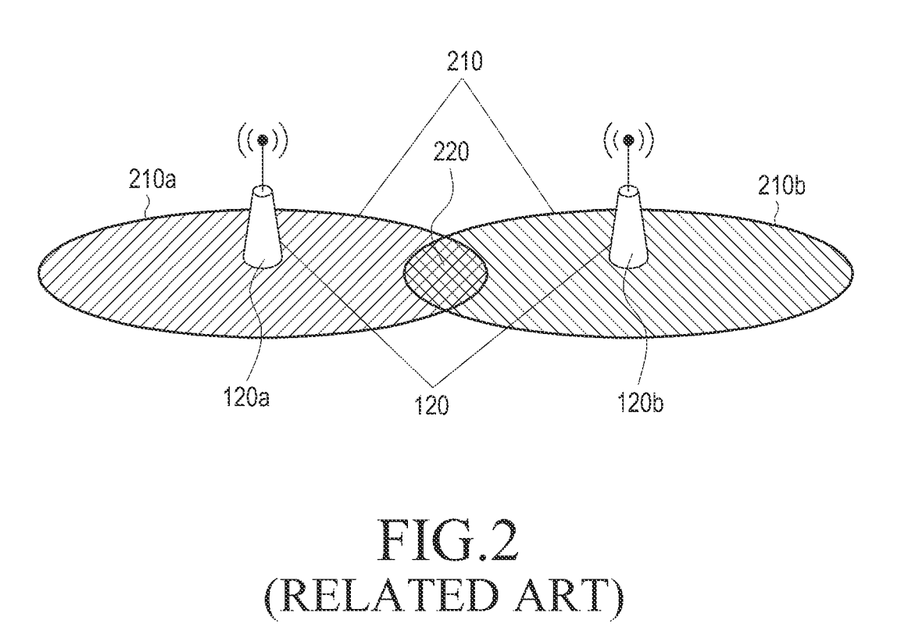
FIG. 2 is a schematic view illustrating coverage area overlap according to the related art.

FIG. 2 is a schematic diagram illustrating coverage area overlap according to the related art.

Referring to FIG. 2, two adjacent radio access points 120a and 120b generally have their own coverage areas 210a and 210b, respectively. There may be an overlapped area 220 between the coverage area 210a and the coverage area 210b. If the UE 100 is located in the overlapped area 220, the UE 100 may experience severe interference from a signal received from at least one of the radio access points 120a and 120b. For example, if the UE 100 is receiving a service from the radio access point 120a, the UE 100 may experience severe interference from the radio access point 120b.

While the radio access points 120a and 120b are shown in FIG. 2 as having a similar-sized coverage area 210 (210a and 210b), this should not be construed as limiting the present disclosure. Thus, interference situations caused by the inclusion of the coverage area of one radio access point in the coverage area of another radio access point, overlap among the coverage areas of three or more radio access points, and other various coverage area overlaps may be considered in the present disclosure.

The 3$^{rd}$ Generation Partnership Project (3GPP) has been developing a technology of enabling a plurality of radio access points 120 to communicate in cooperation in order to mitigate interference. An example of the technology is Coordinated Multi-Point Transmission and Reception (CoMP).

If a coordination range goes beyond one radio access point, that is, coordination between a plurality of radio access points is considered, information may be exchanged between the radio access points.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently exchanging information between radio access points.

In accordance with an aspect of the present disclosure, a method for performing coordinated communication between radio access points in a communication system is provided. The method includes receiving, by a first radio access point, a message requesting channel information from a second radio access point, transmitting, by the first radio access point, a response message in reply to the message requesting channel information to the second radio access point, transmitting, by the first radio access point, a message reporting the channel information to the second radio access point, and receiving, by the first radio access point, resource allocation information for Coordinated Multi-Point transmission and reception (CoMP) from the second radio access point.

In accordance with another aspect of the present disclosure, a radio access point for performing coordinated communication between radio access points in a communication system is provided. The radio access point includes a transceiver configured to receive a message requesting channel information from another radio access point, to transmit a response message in reply to the message requesting channel information to the other radio access point, to transmit a message reporting the channel information to the other radio access point, and to receive resource allocation information for CoMP from the other radio access point, and a controller configured to control an operation of the transceiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While the present disclosure focuses on a Long Term Evolution (LTE) network and an Evolved Packet Core (EPC) which are a radio access network and a core network standardized by the $3^{rd}$ Generation Partnership Project (3GPP) in describing embodiments of the present disclosure, those skilled in the art will understand that the subject matter of the present disclosure is applicable to other communication systems having similar technical backgrounds through slight modifications without departing from the scope of the present disclosure.

Figure 3:
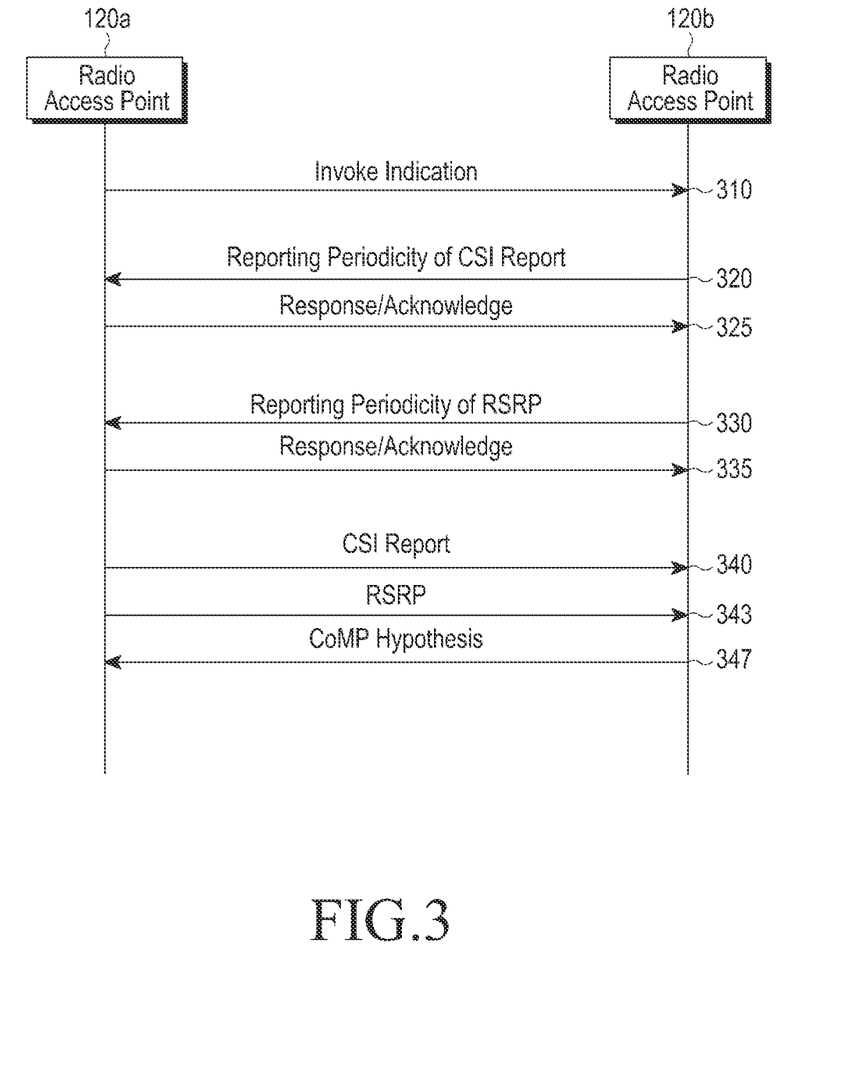
FIG. 3 is a diagram illustrating a signal flow for an operation for exchanging information between radio access points according to an embodiment of the present disclosure.

FIG. 3 is a diagram illustrating a signal flow for an operation for exchanging information between radio access points according to an embodiment of the present disclosure.

According to the embodiment of the present disclosure, each radio access point may transmit or receive a Channel Status Information (CSI) report and/or a Reference Signal Received Power (RSRP) and may receive or transmit Coordinated Multi-Point (CoMP) hypothesis information based on the CSI report and/or the RSRP.

Referring to FIG. 3, the radio access point 120a may transmit a message requesting transmission of information used for coordination between radio access points to another radio access point 120b in operation 310. Specifically, the message may request the radio access point 120b to transmit Coordinated Multi-Point transmission and reception (CoMP) information. Further, the message may be a newly defined message or a load information message. The message may include an Invoke Indication Information Element (IE).

The Invoke Indication IE may be represented as illustrated in Table 1.

TABLE 1

| IE/Group Name | Presence | Range | IE type and reference | Semantics description |
|---|---|---|---|---|
| Invoke Indication | M | | ENUMERATED (ABS Information, CoMP Information, . . .) | — |

The message may include information indicating how often transmission of CoMP hypothesis information is requested. For example, the radio access point 120a may transmit one of 5 ms, 10 ms, 20 ms, 40 ms, and 80 ms as periodicity information to the radio access point 120b. If the periodicity information is not indicated, the radio access point 120b may determine that the radio access point 120a does not want any specific periodicity.

Upon receipt of the message, the radio access point 120b may need channel information about a UE served by the radio access point 120a in order to transmit CoMP information. Accordingly, the radio access point 120b may transmit a message requesting channel information in operations 320 and 330. The message may be a newly defined message or a resource status request message. The newly defined message may be, for example, a channel status request message. The message may include at least one of information indicating channel information requested by the radio access point 120b and a reporting periodicity. The message may further include a cell Identifier (ID) for which channel information is requested.

The message may be represented as illustrated in Table 2.

TABLE 2

| IE/Group Name | Presence | Range | IE type and reference | Semantics description | Criticality | Assigned Criticality |
|---|---|---|---|---|---|---|
| Report Characteristics | O | | BITSTRING (SIZE(32)) | Each position in the bitmap indicates measurement object the eNB$_2$ is requested to report. First Bit = PRB Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Sixth Bit = CSI Report, | YES | reject |

TABLE 2-continued

| IE/Group Name | Presence | Range | IE type and reference | Semantics description | Criticality | Assigned Criticality |
|---|---|---|---|---|---|---|
| | | | | Seventh Bit = RSRP. Other bits shall be ignored by the eNB$_2$. | | |
| Cell To Report | | 1 | | Cell ID list for which measurement is needed | YES | ignore |
| >Cell To Report Item | | 1 . . . <maxCellineNB> | | | EACH | ignore |
| >>Cell ID | M | | ECGI | | — | — |
| Reporting Periodicity | O | | ENUMERATED(1 ms, 2 ms, 5 ms, 10 ms, 20 ms, 50 ms, 100 ms, 200 ms, 500 ms, 1000 ms, 2000 ms, 5000 ms, 10000 ms, . . .) | | YES | ignore |

In Table 2, eNB$_2$ may correspond to the radio access point 120*a*. While 1 ms, 2 ms, 5 ms, 10 ms, 20 ms, 50 ms, 100 ms, 200 ms, 500 ms, 1000 ms, 2000 ms, 5000 ms, and 10000 ms are listed in Table 2 as available as values of a Reporting Periodicity IE, by way of example, those skilled in the art will clearly understand that other appropriate values may be set in the Reporting Periodicity IE or all or a part of the enumerated values may not be included.

If the radio access points 120*b* are to set different periodicities for a CSI report and an RSRP, the radio access point 120*b* may set the periodicities in the two messages as in operations 320 and 330 of FIG. 3. Or while not illustrated in Table 2, the radio access point 120*b* may set two or more periodicities in one message. One of the periodicities may be for a CSI report and another periodicity may be for an RSRP.

While the sixth and seventh bits of a Reporting Characteristics IE indicate a CSI report and an RSRP, respectively in Table 2, it will be apparent to those skilled in the art that this may vary according to embodiments.

The radio access point 120*b* may not set a reporting periodicity in the message. In this case, the radio access point 120*b* may transmit a message requesting transmission of information required for coordination between radio access points, without an explicit reporting periodicity to the radio access point 120*a*.

The radio access point 120*a* may transmit a response message to the message received in operation 320 and/or operation 330 in operations 325 and/or 335. The response message may be a resource status response message, a resource status failure message, or a new message. The new message may be, for example, a channel status response message or a channel status failure message. The response message may include an indication about unreportable information. If none of requested information is reportable, a cause for the report failure may be indicated. The cause may be, for example, overload of the radio access point 120*a* or non-support of a requested periodicity.

The response message may be represented as illustrated in Table 3.

TABLE 3

| IE/Group Name | Presence | Range | IE type and reference | Semantics description | Criticality | Assigned Criticality |
|---|---|---|---|---|---|---|
| Measurement Initiation Result | | 0 . . . 1 | | List of all cells in which measurement objects were requested, included when indicating partial success | YES | ignore |
| >Measurement Initiation Result Item | | 1 . . . <maxCellineNB> | | | EACH | ignore |
| >>Measurement Failure Cause List | | 0 . . . 1 | | Indicates that eNB$_2$ could not initiate the measurement for at least one of the requested measurement objects in the cell | — | — |
| >>>Measurement Failure Cause Item | | 1 . . . <maxFailedMeasObjects> | | | EACH | ignore |
| >>>>Measurement Failed Report Characteristics | M | | BITSTRING (SIZE(32)) | Each position in the bitmap indicates measurement object that failed to be initiated in the eNB$_2$. First Bit = PRB Periodic, Second Bit = TNL load Ind Periodic, Third Bit = HW Load Ind Periodic, Fourth Bit = Composite Available Capacity Periodic, Fifth Bit = ABS Status Periodic, Sixth Bit = CSI Report, | — | — |

TABLE 3-continued

| IE/Group Name | Presence | Range | IE type and reference | Semantics description | Criticality | Assigned Criticality |
|---|---|---|---|---|---|---|
| >>>>Cause | M | | | Seventh Bit = RSRP. Other bits shall be ignored by the $eNB_1$. Failure cause for measurement objects for which the measurement cannot be initiated | — | — |

In Table 3, $eNB_2$ may correspond to the radio access point 120a and $eNB_1$ may correspond to the radio access point 120a. While the sixth and seventh bits of a Measurement Failed Report Characteristics IE indicate a CSI report and an RSRP, respectively in Table 3, it will be apparent to those skilled in the art that this may vary according to embodiments.

The radio access point 120a may transmit a message reporting the requested information in operations 340 and 343. The message may be transmitted periodically according to a requested periodicity. In the absence of a requested periodicity, the message may be transmitted intermittently. The message may be a resource status update message or a new message. The new message may be, for example, a channel status update message. The message may include at least one of a CSI report and an RSRP. The message may include the cell ID for which the channel information is requested. The cell ID may be information identifying a cell requested in operation 320 and/or operation 330.

The message may be represented as illustrated in Table 4.

TABLE 4

| IE/Group Name | Presence | Range | IE type and reference | Semantics description | Criticality | Assigned Criticality |
|---|---|---|---|---|---|---|
| Cell Measurement Result | | 1 | | | YES | ignore |
| >Cell Measurement Result Item | | 1 ... <maxCellineNB> | | | EACH | ignore |
| >>Cell ID | M | | ECGI | | | |
| >>CSI Report Information | O | | | | | |
| >>RSRP Information | O | | | | | |

In Table 4, a CSI Report Information IE is an example of an IE carrying a CSI report. A plurality of CSI reports may be transmitted. One or more CSI reports may be transmitted:
  Per cell for which the radio access point 120a is supposed to report channel information;
  Per subframe in a reporting period;
  Per PRB or PRB group;
  For each of a part or all of UEs served by the radio access point 120a; and
  Per CSI process.

At least one of the above conditions may be omitted. A PRB group may be a subband. Each CSI report may include additional information about an associated CSI process. The additional information may include CSI configuration information. The CSI configuration information may include at least one of a resourceConfig-11 IE and a subframeConfig-11 IE (information indicating whether the CSI process is an interference measurement-related configuration or a CSI-Reference Signal (CSI-RS)-related configuration (or specifically, a CSI-RS Non-Zero Power (NZP)-related configuration).

For example, if up to N CSI reports are supposed to be transmitted per cell, the CSI Report Information IE which is an IE carrying a CSI report may be represented as illustrated in Table 5. Herein, N may be 0 or a positive integer.

TABLE 5

| IE/Group Name | Presence | Range | IE type and reference | Semantics description |
|---|---|---|---|---|
| CSI Report Information | M | | | |
| >PRB-Specific CSI Report Information | | 1 ... <maxnoofPRBs> | | |

TABLE 5-continued

| IE/Group Name | Presence | Range | IE type and reference | Semantics description |
|---|---|---|---|---|
| >>PRB Index | | | INTEGER (1 ... 110) | |
| >>CSI Reports | | 1 ... N | | |
| >>>CSI Report | | | | |
| >>>>RI | | | | |
| >>>>PMI | | | | |
| >>>>CQI | | | | |
| >>>CSI Config | | | | |
| >>>>CSI Resource Indicator | | | ENUMERATED (CSI-IM, CSI-RS, ...) | |
| >>>>Resource Config | | | INTEGER (0 ... 31) | CSI reference signal configuration |
| >>>>Subframe Config | | | INTEGER (0 ... 154) | $I_{CSI-RS}$ |

If the CSI report is transmitted in each subframe, the CSI Report Information IE may include a subframe index. If the CSI report is transmitted per UE, the CSI Report Information IE may include a UE ID. The UE ID may be an eNB UE X2AP ID or its modification (for example, an eNB1 UE X2AP ID, an Old eNB UE X2AP ID, or a Sending eNB UE X2AP ID).

Table 6 lists an example of information that may be included in a message, when one or more CSI reports are transmitted per cell that are supposed to be reported by the radio access point 120a, per subframe within a reporting period, for each PRB, for each of a part or all of UEs served by the radio access point 120a, and per CSI process.

TABLE 6

| IE/Group Name | Presence | Range | IE type and reference | Semantics description |
|---|---|---|---|---|
| CSI Report Information | M | | | |
| >Subframe-Specific CSI Report Information | | 1 ... <maxReportingPeriodicity> | | |
| >>Subframe Index | | | INTEGER (1, ...) | |
| >>PRB-Specific CSI Report Information | | 1 ... <maxnoofPRBs> | | |
| >>>PRB Index | | | INTEGER (1 ... 110) | |
| >>>UE-Specific CSI Report Information | | 1 ... <maxnoofReportingUEs> | | |
| >>>>UE ID | | | eNB UE X2AP ID | |
| >>>>CSI Reports | | 1 ... 4 | | |
| >>>>>CSI Report | | | | |
| >>>>>>RI | | | | |
| >>>>>>PMI | | | | |
| >>>>>>CQI | | | | |
| >>>>>CSI Config | | | | |
| >>>>>>CSI Resource Indicator | | | ENUMERATED (CSI-IM, CSI-RS, ...) | |
| >>>>>>Resource Config | | | INTEGER (0 ... 31) | CSI reference signal configuration |
| >>>>>>Subframe Config | | | INTEGER (0 ... 154) | $I_{CSI-RS}$ |

If CSI reports for a plurality of CSI processes need to be transmitted, the radio access point 120a may separate the CSI reports into at least one different CSI report transmission message and transmit the at least one different CSI report transmission message at a different CSI reporting time. For example, if the radio access point 120a is to transmit CSI reports for four CSI processes, the radio access point 120a may configure one CSI report transmission message with CSI report information for each CSI process. That is, the CSI reports for the four CSI processes may be separated into four CSI report transmission messages. The CSI report transmission messages may be transmitted at different CSI reporting time points. Configuring one CSI report transmission message with CSI report information for each CSI process is purely exemplary. Thus, CSI report information for a plurality of CSI processes may be configured into one CSI report transmission message. In other words, one or more CSI report transmission messages may be configured with CSI report information for a plurality of CSI processes and transmitted at one or more different CSI reporting time points. Since CSI reports for the plurality of CSI processes are transmitted at different time points, the sizes of the CSI report transmission messages may be reduced and information about all CSI processes may be utilized by a cell receiving the CSI reports.

If CSI reports for a plurality of CSI processes need to be transmitted, the radio access point 120a may transmit the CSI reports by a plurality of UE IDs. For example, if the radio access point 120a is to transmit CSI reports for three CSI processes with UE ID 0, the radio access point 120a may transmit CSI reports for CSI processes 0, 1, and 2 using three different UE IDs, UE IDs 0, 1 and 2. That is, CSI report information for each CSI process may be distinguished by a UE ID and one CSI report transmission message may be configured with the CSI report information for each CSI process.

In other words, since CSI reports for one UE can be delivered using at least one distinguished UE ID, CSI reports for a plurality of CSI processes may be transmitted. As CSI reports for a plurality of CSI processes are transmitted using a plurality of UE IDs, the sizes of the CSI report transmission messages may be reduced and information about all CSI processes may be utilized by a cell receiving the CSI reports.

Table 7 illustrates an example of information that may be included in a CSI report transmission message, if one or more CSI reports are transmitted per cell supposed to be reported by the radio access point 120a, for each of part or all of UEs served by the radio access point 120a, and per CSI process. Since a resource status update message is designed to transmit a measurement result per cell, Table 7 illustrates transmission of a CSI report per UE, per subband, and per CSI process.

subband/wideband CQI and an RI have been acquired based on the information and may generate a CoMP hypothesis based on the determined environment.

It is expected that resources will be wasted if information about a CSI process configuration environment is transmitted without processing. If resourceConfig and subframeConfig values for a CSI-RS and a CSI-IM are transmitted as they are, 26 bits are used for each CSI process. To conserve resources, configuration environments may be preset and indexed between the radio access points 120a and 120b so that they may readily exchange CSI process indexes. It is also possible to transmit resourceConfig and subframeConfig values for a CSI-RS and a CSI-IM as they are according to an embodiment of the present disclosure.

If the same CSI process configuration is implemented for UEs served by the cell of the radio access point 120a, even CSI process indexes may not be transmitted because the environments of CSI processes may be derived in the order of CSI information for the CSI processes.

TABLE 7

| IE/Group Name | Presence | Range | IE type and reference | Semantics description |
|---|---|---|---|---|
| CSI Feedback UE-Specific | | 1 . . . <maxUECSIReport> | | |
| >C-RNTI | M | | BIT STRING (SIZE (16)) | ID of the UE served by the cell in eNB$_2$. Defined in TS 36.331 [9]. |
| >CSI Feedback Subband-Specific | | 1 . . . <maxSubband> | | The first item appears in the list is corresponding to the first subband |
| >>CSI Feedback CSI Process-Specific | | 1 . . . <maxCSIProcess> | | |
| >>>CSI Process Index | M | | INTEGER (0 . . . 31, . . .) | Index of the CSI process. Configured between eNBs. |
| >>>Subband CQI | M | | BIT STRING (SIZE(2)) | Defined in TS 36.213 [11]. |
| >>>Wideband CQI | O | | BIT STRING (SIZE(4)) | Included if the value of the Subband Index IE = 0. Defined in TS 36.213 [11]. |
| >>>RI | O | | BIT STRING (SIZE(3)) | Included if the value of the Subband Index IE = 0. Defined in TS 36.213 [11]. |

CSI per UE may include a UE ID (for example, a C-RNTI) and CSI for each of one or more subbands. CSI for each subband may include CSI for each of one or more CSI processes. The CSI for each CSI process may include at least one of a CSI process index, a subband Channel Quality Indicator (CQI), a wideband CQI, and a Rank Indicator (RI).

The cell of the radio access point 120a may configure a different CSI process for each served UE. Configuring a CSI process means indicating CSI-RS/Interference Measurement (IM) resources for measurement to a UE. Thus, when the first radio access point 120a transmits CSI to the second radio access point 120b, the first radio access point 120a needs to indicate a configuration environment in which each CSI process has been performed. The second radio access point 120b may determine an environment in which a In Table 4, an RSRP Information IE is an IE carrying an RSRP. A plurality of RSRPs may be transmitted. An RSRP may be transmitted:

Per cell supposed to reported by the radio access point 120a;

Per cell to be measured; and

For each of part or all of UEs served by the radio access point 120a.

At least one of the above conditions may be omitted. When each RSRP is transmitted, the ID of a cell to be measured may also be included.

For example, if an RSRP is transmitted per cell supposed to be reported and per cell to be measured, the RSRP Information IE being an IE carrying an RSRP may be represented as Table 8.

TABLE 8

| IE/Group Name | Presence | Range | IE type and reference | Semantics description |
|---|---|---|---|---|
| RSRP Information | M | | | |
| >Cell-Specific RSRP Information | | 1 . . . <maxnoofNeighbours> | | |

TABLE 8-continued

| IE/Group Name | Presence | Range | IE type and reference | Semantics description |
|---|---|---|---|---|
| >>Cell ID | | | ECGI | |
| >>RSRP | | | | |

Table 9 lists an example of information that may be included in a message, when an RSRP is transmitted per cell that is supposed to be reported by the radio access point 120a, per cell to be measured, and for each of part or all of UEs served by the radio access point 120a. The UEs may be randomly selected by the radio access point 120a. A cell to be measured may be identified by, for example, a Cell ID IE listed in Table 4. The part or all of the UEs served by the radio access point 120a may be identified by UE IDs. The UE IDs may be, for example, eNB UE X2AP IDs or C-RNTIs. In Table 9 below, eNB UE X2AP IDs are used, by way of example.

TABLE 9

| IE/Group Name | Presence | Range | IE type and reference | Semantics description |
|---|---|---|---|---|
| RSRP Information | M | | | |
| >UE-Specific RSRP Information | | | | |
| >>UE ID | | 1 . . . <maxnoofReportingUEs> | eNB UE X2AP ID | |
| >>Cell-Specific RSRP Information | | 1 . . . 8 (or 9) | | |
| >>>Cell ID | | | ECGI | |
| >>>RSRP | | | | |

Up to 8 RSRP measurements (or 9 RSRP measurements if a serving cell is included) obtained by each UE may be transmitted per UE. Cell IDs (E-UTRAN Cell Global Identifiers (ECGIs) or Physical Cell Identifiers (PCIs)) corresponding to the RSRP measurement results may also be transmitted. Upon receipt of RSRP information, the radio access point 120b may store the RSRP information or update previous RSRP information with the received RSRP information. Further, the radio access point 120b may use the received information in generating CoMP information.

CSI-related information and RSRP-related information may be exchanged in the same or different procedures. For example, both the CSI-related information and the RSRP-related information may be exchanged in a resource status reporting initiation procedure involving resource status request, resource status response, and resource status failure messages and/or a resource status reporting procedure involving a resource status update message. In another example, the CSI-related information may be exchanged in the resource status reporting initiation and resource status reporting procedures, whereas the RSRP-related information may be exchanged in a new procedure involving a new message.

The radio access point 120b may transmit the generated CoMP information in operation 347. The CoMP information may include a CoMP hypothesis. The CoMP hypothesis may be a hypothesis of resource allocation to the radio access point 120a, generated by the radio access point 120b. Accordingly, the CoMP hypothesis may be referred to as a resource allocation hypothesis. The CoMP hypothesis may be expressed as a bitmap and each bit of the bitmap may represent a PRB or PRB group. The bitmap may have a length of up to 110. If a bit of the bitmap is set to 1, it may indicate resource allocation and if the bit is set to 0, it may indicate resource non-allocation. In another example, the CoMP hypothesis may be expressed as a vector (or sequence) and each element of the vector may represent a PRB or PRB group. The vector may have a dimension of up to 110 and the value of each element in the vector may indicate the magnitude of transmission power of a PRB or PRB group. A load information message or a new message may carry the CoMP hypothesis.

The CoMP hypothesis may be transmitted:

For each of one or more cells of the radio access point 120a;

For each cell of other coordinated radio access points; or

Per subframe.

At least one of the above conditions may be omitted.

For example, if a CoMP hypothesis is transmitted for each of one or more cells of the radio access point 120a and for each cell of other coordinated radio access points, the CoMP hypothesis may be have the configuration illustrated in Table 10.

TABLE 10

| IE/Group Name | Presence | Range | IE type and reference | Semantics description |
|---|---|---|---|---|
| CoMP Hypothesis Information | | 0 . . . <maxnoofNeighbours> | | |
| >Cell ID | M | | ECGI | |
| >CoMP Hypothesis | M | | BITSTRING | |

Table 10 illustrates an example of information that may be included in a message, when a CoMP hypothesis is transmitted for each of one or more cells of the radio access point 120a and for each cell of other coordinated radio access points.

TABLE 11

| IE/Group Name | Presence | Range | IE type and reference | Semantics description |
|---|---|---|---|---|
| CoMP Hypothesis Information | | 0 . . . <maxnoofNeighbours> | | |
| >Subframe-Specific CoMP Hypothesis Information | | 1 . . . <maxReportingPeriodicity> | | |
| >>Subframe Index | | | | |
| >>Cell-Specific CoMP Hypothesis Information | | 0 . . . <maxnoofNeighbours> | | |
| >>>Cell ID | M | | ECGI | |
| >>>CoMP Hypothesis | M | | BITSTRING | |

Table 12 illustrates another example of transmitting a CoMP hypothesis. A CoMP Hypotheses IE carrying CoMP hypotheses may be applied, starting from a system frame and/or a subframe identified by indicated time information (an SFN IE and/or a Subframe Index IE in the example of Table 11). CoMP hypotheses may be provided for neighbor cells (identified by a Neighbor Cell ID IE) as well as a serving cell of the radio access point 120a (identified by a Target Cell ID). An ECGI or PCI may identify a cell. The radio access point 120b may transmit a plurality of CoMP hypotheses (for the serving cell of the radio access point 120a and its neighbor cells) in one message. A Validity Period IE may be included for each of the serving cell of the radio access point 120a and its neighbor cells. This IE may indicate time points for application to each of the serving cell of the radio access point 120a and its neighbor cells. For example, this IE indicates 5 ms and 10 ms in Table 12. Many other values may be available.

TABLE 12

| IE/Group Name | Presence | Range | IE type and reference | Semantics description |
|---|---|---|---|---|
| CoMP Information | | | | |
| >SFN | | | INTEGER (0 . . . 1023, . . .) | Number of the first system frame where the CoMP Hypotheses IE is meant |
| >Subframe Index | | | INTEGER (0 . . . 9, . . .) | Index of the first subframe where the CoMP Hypotheses IE is meant |
| >CoMP Hypothesis Set | | 1 . . . <maxnoofCoMPHypothesisSet (may equal to 128)> | | Items in the list are applied sequentially for the period indicated by the Validity Period IE |
| >>CoMP Hypothesis | | | BIT STRING (1 . . . 110, . . .) | RB-specific bitmap for the cell identified by the Target Cell ID IE. Each PRB is identified by its position in the bitmap; the first element in the bitmap corresponds to PRB 0, the second to PRB 1, etc. Value 1 indicates hypothetical resource allocation for the concerning PRB and value 0 does otherwise. |
| >>Neighbour CoMP Hypotheses | | 0 . . . <maxnoofNeighbours> | | |
| >>>Neighbour Cell ID | M | | ECGI or PCI | Cell ID of the neighbor of the cell identified by the Target Cell ID IE |
| >>>Neighbour CoMP Hypothesis | M | | BIT STRING (1 . . . 110, . . .) | RB-specific bitmap for the cell identified by the Neighbor Cell ID IE. Each PRB is identified by its position in the bitmap; the first element in the bitmap corresponds to PRB 0, the second to PRB 1, etc. Value 1 indicates hypothetical resource allocation for the concerning PRB and value 0 does otherwise. |
| >>Validity Period | O | | ENUMERATED (5 ms, 10 ms, . . .) | Period for which the CoMP Hypothesis IE and Neighbor CoMP Hypotheses IE are valid. |

TABLE 12-continued

| IE/Group Name | Presence | Range | IE type and reference | Semantics description |
| --- | --- | --- | --- | --- |
| | | | | If not included, the validity period is 1 ms. |

Information about a time point (that is, a system frame number and/or a subframe number) at which a CoMP hypothesis, or more comprehensively, CoMP information starts to be applied is transmitted along with the CoMP information because the transmission delay of an interface between the radio access points 120a and 120b is not constant. If the transmission delay is constant, for example, the radio access point 120a may apply the CoMP information immediately when it receives the CoMP information. This is because the radio access point 120b may predict when the radio access point 120a will apply the CoMP information. However, because a transmission jitter is inevitable, there is a need for an agreement on a time to apply the received CoMP information. Therefore, the radio access point 120b may transmit a system frame number and/or a subframe number along with CoMP information. The radio access point 120b may consider applying the CoMP information to scheduling, starting from the system frame number and/or the subframe number along with the CoMP information.

The CoMP information may include a validity period during which the CoMP information or part of the CoMP information is valid. If the CoMP information is transmitted along with the validity period, the radio access point 120a may apply all or the part of the CoMP information (repeatedly) during the time period indicated by the validity period. The CoMP information may be applied, stating from its reception time, subframe 0 closest to the reception time, or the system frame number and/or the subframe number received along with the CoMP information. For example, if the validity period is 10 ms and CoMP information corresponding to 5 ms is received, a radio access point may consider applying the CoMP information corresponding to 5 ms twice for scheduling (2*5 ms=10 ms). Upon receipt of new CoMP information even before expiration of the validity period, the radio access point 120a may determine that the old CoMP Information is not valid, starting from a specific time. The specific time may be a time at which the new CoMP information is valid.

The radio access points 120a and 120b may discontinue reporting of an RSRP measurement or transmission of a CoMP hypothesis for various reasons. If the radio access point 120a wants to discontinue reporting of an RSRP measurement or transmission of a CoMP hypothesis, the radio access point 120 may discontinue transmission of a message carrying channel information (for example, a resource status update message). Or the radio access point 120a may explicitly request the discontinuation by transmitting a load information message with an Invoke Indication IE set to an appropriate value (for example, CoMP Hypothesis Deactivation). If the radio access point 120b requests the discontinuation, the radio access point 120b may transmit a resource status request message with a registration request IE set to stop.

Figure 6:
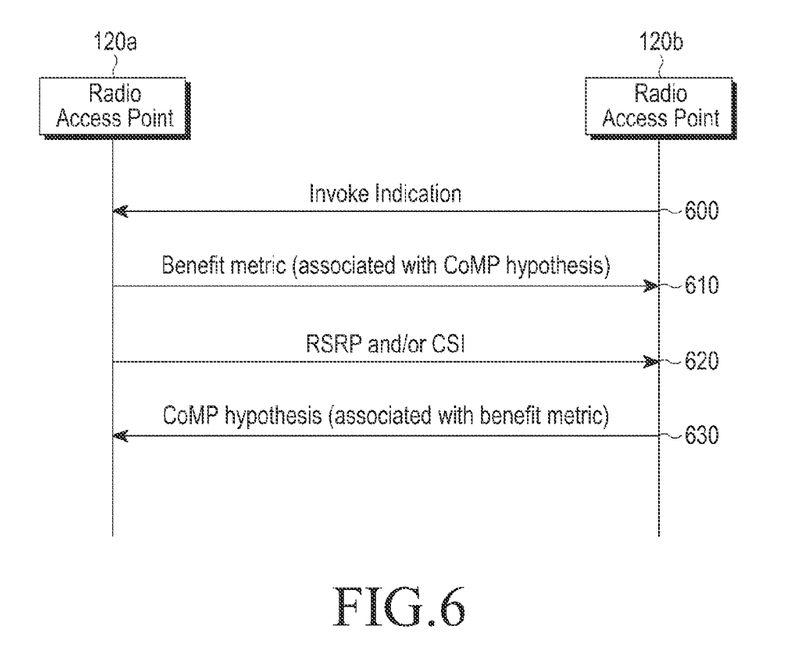
FIG. 6 is a diagram illustrating a signal flow for an operation for exchanging resource allocation hypothesis information and a benefit metric between radio access points according to an embodiment of the present disclosure.

FIG. 6 is a diagram illustrating a signal flow for an operation for exchanging CoMP information between the radio access points 120a and 120b according to an embodiment of the present disclosure.

In the embodiment of the present disclosure described above with reference to FIG. 3, the radio access point 120b may receive CSI-related information and/or RSRP-related information from the radio access points 120a in order to calculate CoMP information. On the other hand, in the embodiment of the present disclosure illustrated in FIG. 6, the radio access point 120b may receive a benefit metric in addition to the CSI-related information and/or RSRP-related information from the radio access points 120a. In addition, the radio access point 120b may transmit another benefit metric along with a CoMP hypothesis to the radio access point 120a.

Before describing this embodiment of the present disclosure in detail, an input-output relationship will be made clear as follows.

Input: a benefit metric in operation 610, RSRP-related information in operation 620, and/or CSI-related information in operation 620; and Output: a CoMP hypothesis in operation 630.

A benefit metric is a value indicating a gain predicted on the assumption of a specific resource allocation. The benefit metric needs to be transmitted along with information indicating the assumed resource allocation, that is, a CoMP hypothesis. Accordingly, the benefit metric may be transmitted along with the CoMP hypothesis in operation 610. When the CoMP hypothesis is transmitted, information about a gain expected when this resource allocation hypothesis information is followed may also be transmitted in operation 630. Thus, the CoMP hypothesis may be transmitted together with the benefit metric in operation 630. Consequently, the CoMP hypothesis and the benefit metric may be transmitted in operations 610 and 630. For the convenience' sake, a CoMP hypothesis and/or a benefit metric will be referred to as CoMP information.

An embodiment of the present disclosure will be described in detail with reference to FIG. 6.

The radio access point 120b may need to collect information required for CoMP implementation and thus may transmit a message requesting CoMP information in operation 600. This message may be a load information message. As illustrated in Table 1, the message may include an Invoke Indication. If an Invoke Indication is set to indicate CoMP Information, the radio access point 120b requests the radio access points 120a to transmit CoMP information.

The radio access point 120a may transmit the CoMP information in operation 610. The CoMP information transmission may be triggered by the Invoke Indication received in operation 600 or may be autonomously performed by the radio access point 120a. The radio access point 120a may transmit RSRP-related information and/or CSI-related information in addition to the CoMP information in operation 620. Operation 620 may be performed in the same manner as all or a part of operations 320 to 324 of FIG. 3. Having collected the information, the radio access point 120b transmits CoMP information to the radio access point 120a in operation 630.

The CoMP information transmitted in operation 610 may be different from the CoMP information transmitted in operation 630. The main purpose of the CoMP information transmitted in operation 610 lies in transmission of a benefit metric and a CoMP hypothesis indicates a resource allocation on the assumption of which this benefit metric is calculated. The radio access point 120a may transmit a plurality of benefit metrics indicating benefits to be achieved based on the assumption of various CoMP hypotheses. Because a CoMP hypothesis is not an actual resource allocation but a mere assumption, there is no need for necessarily defining a CoMP hypothesis for each PRB. In other words, the CoMP hypothesis transmitted in operation 610 may be generated on a wideband basis. The radio access point 120b may receive benefit metrics from a plurality of radio access points 120a, calculate a CoMP hypothesis which is a resource allocation increasing the gain of an overall cluster using RSRP-related information and/or CSI-related information as well as the benefit metrics, and transmits the CoMP hypothesis in CoMP information in operation 630. The main purpose of the CoMP information transmitted in operation 630 lies in transmission of the CoMP hypothesis and a benefit metric is secondary information because it indicates a gain that may be expected from the CoMP hypothesis. Since the CoMP information is actual resource allocation information (recommended by the radio access point 120b), there is a need for defining CoMP information for each PRB, without the need for providing various candidates.

As described above, the CoMP information transmitted in operations 610 and 630 may differ in characteristics but may be defined in one message. The radio access points 120a and 120b may appropriately control each part of the message, for their intended usages. In summary, CoMP information needs to be provided per PRB or wideband; for a plurality of cells; for one or more subframes; and for a plurality of candidates. Table 13 illustrates an example of configuring CoMP information satisfying the above requirements.

TABLE 13

| IE/Group Name | Presence | Range | IE type and reference | Semantics description |
|---|---|---|---|---|
| CoMP Information Item | | 1 . . . <maxnoofCoMPInformation> | | |
| >CoMP Hypothesis Set | M | | | |
| >Benefit Metric List | M | 1 . . . 550 | | |

A CoMP Hypothesis Set IE may be configured as illustrated in Table 14.

TABLE 14

| IE/Group Name | Presence | Range | IE type and reference | Semantics description |
|---|---|---|---|---|
| CoMP Hypothesis Set Element | | 1 . . . <maxnoofCoMPCells> | | |
| >Cell ID | M | | ECGI | ID of the cell for which the CoMP Hypothesis IE is applied. |
| >CoMP Hypothesis | O | | BIT STRING (1 or 6 . . . 550, . . .) | If the length of the bit string is greater than 5, the first $N_{RB}^{DL}$ bits are applied for the first subframe corresponding to this CoMP hypothesis set; the second $N_{RB}^{DL}$ bits are applied for the second; and so on. $N_{RB}^{DL}$ is defined in TS 36.211 [10]. If the length of the bit string is less than 6, the first bit is applied for the first subframe corresponding to this CoMP hypothesis set; the second bit is applied for the second; and so son. |
| >CoMP Hypothesis Wideband | O | | BIT STRING (1 . . . 5, . . .) | In case length of the CoMP Hypothesis IE is always greater than 5, the first bit is applied for the first subframe corresponding to this CoMP hypothesis set; the second bit is applied for the second; and so son. |

If the size of the CoMP Hypothesis IE is 6 or more bits, each bit may represent a PRB. Considering that a maximum downlink transmission bandwidth is 110 PRBs, the maximum size of the CoMP Hypothesis IE may be set to a natural number multiple of 110. In Table 14, the size of the CoMP Hypothesis IE is, for example, 550. In the case where the size of the CoMP Hypothesis IE is 6 or more bits, upon receipt of a CoMP Hypothesis IE having a length exceeding the downlink transmission bandwidth $N_{RB}^{DL}$ of a corresponding cell, a radio access point 120 may determine the first $N_{RB}^{DL}$ bits to be a resource allocation hypothesis for the first corresponding subframe (one or more subframes) and the second $N_{RB}^{DL}$ bits to be a resource allocation hypothesis for the second corresponding subframe (one or more subframes).

If the size of the CoMP Hypothesis IE is less than 6 bits, each bit may represent a wideband. If the size of a CoMP Hypothesis IE is less than 6 bits, the radio access point 120 may determine the first $N_{RB}^{DL}$ bits to be a resource allocation hypothesis for the first corresponding subframe (one or more subframes) and the second $N_{RB}^{DL}$ bits to be a resource allocation hypothesis for the second corresponding subframe (one or more subframes). Since only up to five subframe groups (one or more subframes) can be defined (because the sixth and subsequent bits are used to represent narrow bands), an IE for a wideband may be generated separately.

Upon receipt of a CoMP Hypothesis Wideband IE, the radio access point 120 may determine the first $N_{RB}^{DL}$ bits to be a resource allocation hypothesis for the first corresponding subframe (one or more subframes) and the second $N_{RB}^{DL}$ bits to be a resource allocation hypothesis for the second corresponding subframe (one or more subframes). While the maximum size of the CoMP Hypothesis Wideband IE is given as 5 in Table 14, it may be a higher value than 5 because the CoMP Hypothesis Wideband IE is defined separately.

Since a benefit metric should have the same granularity as a CoMP Hypothesis, it may have up to 550 values (according to the above example). Each of 550 values may be one of integers from −100 to 100.

According to Table 14, the CoMP Hypothesis Set Element may be provided for up to up to maxnoofCoMPCells cells. According to Table 13, a CoMP Information Item IE may be provided for up to maxnoofCoMPInformation candidates.

Therefore, the above CoMP information transmission method may satisfy the requirements of per PRB or wideband, for a plurality of cells, for one or more subframes, and for a plurality of candidates.

Figure 4A:
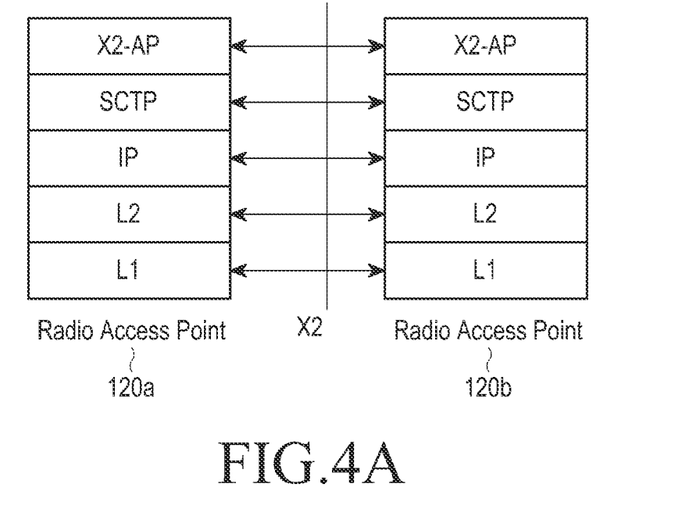
FIGS. 4A and 4B illustrate protocol layer architectures for information exchange between radio access points according to an embodiment of the present disclosure.
Figure 4B:
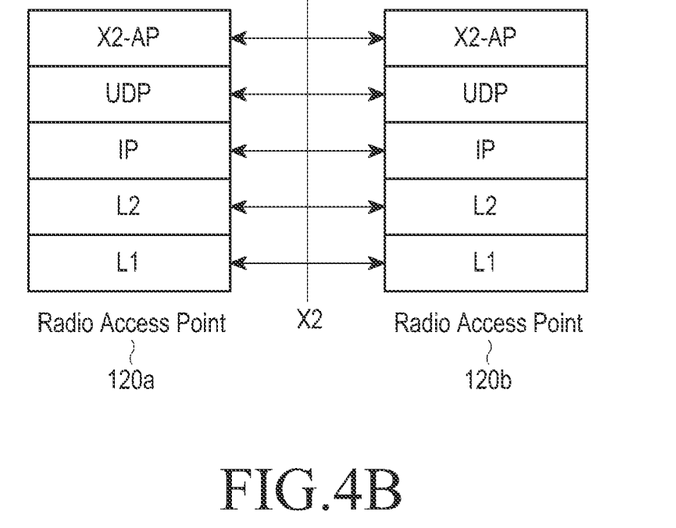

FIGS. 4A and 4B illustrates protocol layer architectures for information exchange between the radio access points 120a and 120b according to an embodiment of the present disclosure.

Referring to FIGS. 4A and 4B, a Stream Control Transmission Protocol (SCTP) (FIG. 4A) or a User Datagram Protocol (UDP) may be used for a Transport Layer (TL).

Real-time information to be transmitted frequently is preferably transmitted by the UDP, compared to the SCTP because the UDP does not have a retransmission mechanism and does not waste computation resources for window management that may be unnecessary. However, due to the absence of an accurate transmission mechanism, the UDP may be less reliable.

For coordination between radio access points, information such as a CSI report should be transmitted frequently, whereas information for call processing between radio access points may not need to be transmitted so frequently.

According to an embodiment of the present disclosure, X2 interfaces using different TL protocols may be used according to signaling characteristics. In other words, an SCTP-based X2 interface and a UDP-based X2 interface may be established between the two radio access points 120a and 120b. Even though X2 interfaces are established using different TL protocols (the UDP and the SCTP), an X2 setup procedure may be performed only once. A message used for the X2 setup procedure may include information about a used TL protocol. The information may be represented as a TL protocol indicator (the SCTP, the UDP, or Both). The information may also be included in an eNB status update procedure.

According to another embodiment of the present disclosure, one or more SCTP-based associations may be established between one radio access point 120a and another access radio point 120b and two or more streams may be constructed in each association. A different detailed setting of the SCTP may be configured for each stream. For example, one stream may emulate the UDP. Emulation of the UDP with the SCTP stream may mean deactivation of one or more SCTP mechanisms such as deactivation of a retransmission function caused by an error or deactivation of a window management function. Another example of configuring a different detailed setting for each SCTP stream is to configure a different Differentiated Services Code Point (DSCP) for each stream. A different priority or processing importance may be assigned to each stream by configuring a different DSCP. For example, priority may be given to call processing during congestion and thus a call processing-related stream may be processed with priority over a stream related to coordination between radio access points.

Figure 5:
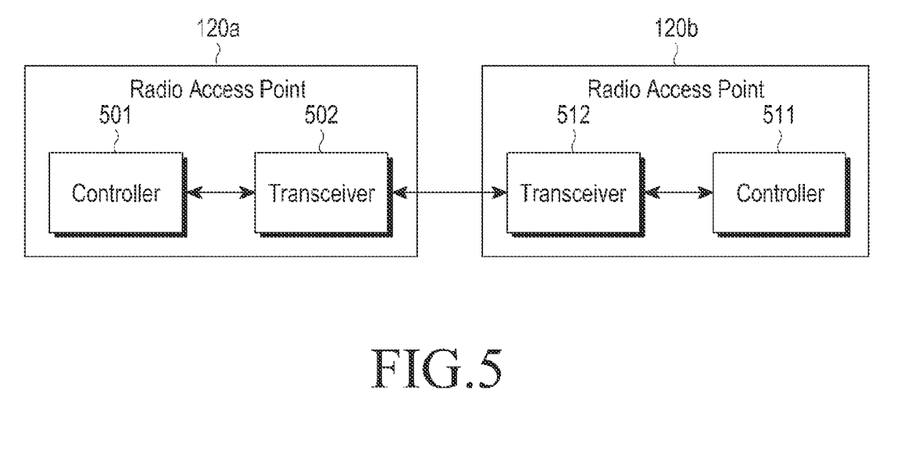
FIG. 5 is a block diagram illustrating radio access points according to an embodiment of the present disclosure.

FIG. 5 is a block diagram illustrating radio access points according to an embodiment of the present disclosure.

Referring to FIG. 5, each of the radio access points 120a and 120b may include a controller 501 or 511 and a transceiver 502 or 512. The controller 501 or 511 controls an operation of the transceiver 502 or 512 and the transceiver 502 or 512 transmits and receives a message to and from another radio access point according to an embodiment of the present disclosure under the control of the controller 501 or 511.

In other words, the transceiver 502 of the radio access point 120a transmits a message requesting information required for coordination between radio access points to the radio access point 120b, receives a message requesting channel information from the radio access point 120b, transmits a response message to the channel information request message to the radio access point 120b, transmits to the radio access point 120b a message reporting information requested by the radio access point 120b, and receives a resource allocation hypothesis for CoMP from the radio access point 120b, under the control of the controller 501.

The transceiver 512 of the radio access point 120b receives a message requesting information required for coordination between radio access points from the radio access point 120a, transmits a message requesting channel information to the radio access point 120a, receives a response message to the channel information request message from the radio access point 120a, receives from the radio access point 120a a message reporting information requested by the radio access point 120b, and transmits a resource allocation hypothesis for CoMP to the radio access point 120a, under the control of the controller 511.

As is apparent from the foregoing description, the method and apparatus for exchanging information related to coordination between radio access points in a wireless communication system according to the present disclosure enables transmission of information required for coordination between radio access points in an efficient message structure with an appropriate periodicity.

It will be apparent to those skilled in the art that the operation of the radio access point 120a may be exchanged with the operation of the radio access point 120b.

In the foregoing embodiments, all steps and messages may be selectively performed and transmitted or may be subject to omission. In each embodiment, the steps may not necessarily be performed in order and thus their sequence may be changed. Also, messages may not necessarily be transmitted in order and thus their sequence may be changed. Each step and each message may be independent.

Part or all of the tables in the forgoing embodiments are provided to help the understanding of the embodiments of the present disclosure. Accordingly, the details of the tables may be regarded as representing part of the methods and apparatuses of the present disclosure. For example, the CoMP Hypothesis IE may be named the Resource Allocation Hypothesis IE. Also the Range may start from 1 and Presence for a sub-IE, Cell ID may be O instead of M. Accordingly, it is preferable to deal with the contents of the tables in terms of semantics rather than in terms of syntax.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing coordinated communication between a first enhanced node b (eNB) and a second eNB in a communication system, the method comprising:
   determining, by the first eNB, a system frame number, a subframe number, and resource allocation information related to coordinated communication;
   transmitting, by the first eNB, a first message including the system frame number, the subframe number, and the resource allocation information, to the second eNB; and
   performing, by the first eNB, coordinated communication with the second eNB based on a starting point of coordinated communication and the resource allocation information,
   wherein the system frame number and the subframe number indicates the starting point,
   wherein the resource allocation information comprises a bit string, and
   wherein a bit of the bit string represents a physical resource block (PRB) for coordinated communication with the second eNB in a subframe.

2. The method of claim 1, further comprising:
   transmitting, by the first eNB, a second message requesting a resource status, to the second eNB; and
   receiving, by the first eNB, a third message in reply to the second message from the second eNB,
   wherein the second message comprises information related to a reference signal received power (RSRP) measurement reporting periodicity and information related to a channel status information (CSI) reporting periodicity of a user equipment (UE) served by the first eNB.

3. The method of claim 2, further comprising:
   receiving, by the first eNB from the second eNB, a fourth message including at least one of:
   an identification of a cell and RSRP measurement information of the UE based on the information related to the RSRP measurement reporting periodicity,
   a rank indicator (RI), a wideband channel quality indicator (CQI), or
   at least one subband CQI of the UE based on the information related to the CSI reporting periodicity,
   wherein the UE measures a RSRP of the cell.

4. The method of claim 1, wherein the resource allocation information is continuously repeated.

5. A method for performing coordinated communication between a first enhanced node b (eNB) and a second eNB in a communication system, the method comprising:
   receiving, by the second eNB, a first message including a system frame number, a subframe number, and resource allocation information related to the coordinated communication, from the first eNB; and
   performing, by the second eNB, coordinated communication with the first eNB based on a starting point of the coordinated communication and the resource allocation information,
   wherein the system frame number and the subframe number indicates the starting point,
   wherein the resource allocation information comprises a bit string, and
   wherein a bit of the bit string represents a physical resource block (PRB) for coordinated communication with the second eNB in a subframe.

6. The method of claim 5, further comprising:
   receiving, by the second eNB, a second message requesting resource status from the first eNB; and
   transmitting to the first eNB, by the second eNB, a third message in reply to the second message,
   wherein the second message comprises information related to a reference signal received power (RSRP) measurement reporting periodicity and information related to a channel status information (CSI) reporting periodicity of a user equipment (UE) served by the first eNB.

7. The method of claim 6, further comprising:
   transmitting to the first eNB, by the second eNB, a fourth message including at least one of:
   an identification of a cell and RSRP measurement information of the UE based on the information related to the RSRP measurement reporting periodicity,
   a rank indicator (RI),
   a wideband channel quality indicator (CQI), or
   at least one subband CQI of the UE based on the information related to the CSI reporting periodicity,
   wherein the UE measures a RSRP of the cell.

8. The method of claim 5, wherein the resource allocation information is continuously repeated.

9. A first enhanced node b (eNB) for performing coordinated communication with a second eNB in a communication system, the first eNB comprising:
   a transceiver configured to transmit a first message including a system frame number, a subframe number, and resource allocation information related to the coordinated communication, to the second eNB; and
   at least one processor configured to:
   determine the system frame number, the subframe number, and the resource allocation information related to the coordinated communication, and perform the coordinated communication with the second eNB based on a starting point of the coordinated communication and the resource allocation information, wherein the system frame number and the subframe number indicate the starting point, wherein the resource allocation information comprises a bit string, and wherein a bit of the bit string represents a physical resource block (PRB) for coordinated communication with the second eNB in a subframe.

10. The first eNB of claim 9,
wherein the transceiver is further configured to:
   transmit a second message requesting resource status to the second eNB, and
   receive a third message in reply to the second message from the second eNB, and
wherein the second message comprises information related to a reference signal received power (RSRP) measurement reporting periodicity and information related to a channel status information (CSI) reporting periodicity of a user equipment (UE) served by the first eNB.

11. The first eNB of claim 10,
wherein the transceiver is further configured to receive, from the second eNB, a fourth message including at least one of:
   an identification of a cell and RSRP measurement information of the UE based on the information related to the RSRP measurement reporting periodicity, a rank indicator (RI), a wideband channel quality indicator (CQI), or
   at least one subband CQI of the UE based on the information related to
   the CSI reporting periodicity, and
wherein the UE measures a RSRP of the cell.

12. The first eNB of claim 9, wherein the resource allocation information is continuously repeated.

13. A second enhanced node b (eNB) for performing coordinated communication with a first eNB in a communication system, the second eNB comprising:

a transceiver configured to receive a first message including a system frame number, a subframe number, and resource allocation information related to the coordinated communication, from the first eNB; and at least one processor configured to perform coordinated communication with the first eNB based on a starting point of the coordinated communication and the resource allocation information, wherein the system frame number and the subframe number indicates the starting point, wherein the resource allocation information comprises a bit string, and wherein a bit of the bit string represents a physical resource block (PRB) for coordinated communication with the second eNB in a subframe.

14. The second eNB of claim 13,
wherein the transceiver is further configured to:
   receive a second message requesting resource status from the first eNB, and
   transmit a third message in reply to the second message from the first eNB, and
wherein the second message comprises information related to a reference signal received power (RSRP) measurement reporting periodicity and information related to a channel status information (CSI) reporting periodicity of a user equipment (UE) served by the first eNB.

15. The second eNB of claim 14,
wherein the transceiver is further configured to transmit a fourth message to the first eNB, the fourth message including at least one of:
   an identification of a cell and RSRP measurement information of the UE based on the information related to the RSRP measurement reporting periodicity,
   a rank indicator (RI),
   a wideband channel quality indicator (CQI), or
   at least one subband CQI of the UE based on the information related to the CSI reporting periodicity, and
wherein the UE measures a RSRP of the cell.

16. The second eNB of claim 13, wherein the resource allocation information is continuously repeated.

* * * * *